Patented Sept. 18, 1928.

1,684,587

UNITED STATES PATENT OFFICE.

EDGAR W. HULTMAN, OF LOS ANGELES, CALIFORNIA.

CARBON-MONOXIDE-TESTING MEANS AND METHOD.

No Drawing. Application filed March 23, 1926. Serial No. 96,882.

As may be inferred from the above designation, this invention relates to means and methods suitable for use in the expeditious and reliable testing of the atmosphere of any room or other enclosure in which the presence of carbon monoxide gas may be suspected,—as by reason of the use therein of any unvented gas-burning heater, or the like, which may be defective in design or in workmanship, or which may be badly adjusted or misused; and this invention relates not only to a novel testing solution and/or a test paper coated or saturated therewith, but also to methods suitable respectively to the production and to the use of said solution and/or said paper.

It is an object of this invention to provide means and methods enabling any ordinary householder or factory or hotel owner or adminstrator, to execute, at his own convenience, and at small expense, such tests as may confirm or overcome anxiety as to the possible production or escape of carbon monoxide gas, or other injurious gases, in his rooms.

It is an object of this invention to provide a gas-test paper whose sensitiveness is insured by the continued presence of water therein; and preferred embodiments of my invention may accordingly include a suitable test reagent associated with a hygroscopic material and/or water,—a bonding or adhesive material being optionally associated therewith.

It is an especial object of this invention to provide simple and advantageous means and methods of utilizing small quantities of the somewhat expensive but highly reactive salt known as palladium protochloride, $PdCl_2$, in detecting carbon monoxide gas, or other dangerous reducing gases, when present in the air of living rooms, or the like.

It is a further object of this invention to provide, as articles of commerce, sealed vials or like units, containing strips of a gas-test paper; and, in preferred embodiments of my invention, the sensitiveness of the mentioned strips may be enhanced by the confinement of water and/or a hygroscopic salt and/or a gelatinous adhesive organic material therewith,—care being taken that the mentioned strips, or their equivalents, formed of a suitably purified material, are free from reducing substances.

Other objects of my invention, including the provision of test papers and/or test solutions containing metallic salts reducible by dangerous gases, such as carbon monoxide or acetylene or hydrogen sulfide (said papers and/or solutions being sufficiently sensitive to establish the presence of carbon monoxide when present in dangerous proportions, although not so sensitive as to yield affirmative results, creating useless anxiety, when no danger exists) may be best appreciated from the following description of illustrative embodiments of my invention, and from the appended claims.

In the preparation of a test solution suitable for use by applying the same to a purified fibrous cellulosic material (such as, for example, an "ashless" filter paper or absorbent cotton) I may, instead of merely dissolving protochlorid of palladium directly in pure water, or instead of merely diluting a commercial solution of palladium protochlorid, weigh out (say) one gram of a pure powdered gelatin, adding this substance (or an equal quantity of agar agar, or the like) to (say) fifty grams of a saturated solution of a hygroscopic agent such as calcium chlorid (or to an equivalent quantity of Glauber's salt, or the like) adding thereto the comparatively pure palladium protochloride solution in sufficient quantity to produce a concentration of the last-mentioned ingredient amounting to about .5% of the total.

The resultant mixture I preferably warm, keeping the same below its boiling point, for a period of ten minutes, more or less, or until it becomes clear. The resultant solution, either before or after it is permitted to cool, may then be applied, in an atmosphere free from reducing gases, to, for example, a practically pure cellulose paper, and the resultant product, when exposed in an atmosphere to be tested, will be found to turn black within a period of 5 minutes, if the atmosphere tested contains carbon monoxide in a dangerous proportion,—such as 5 parts to 10,000 parts of said atmosphere. If the described test paper merely turns grey, this does not necessarily indicate danger, one part of carbon monoxide in 10,000 parts of ordinary air being ordinarily harmless,—althought intermediate quantities may be distinctly detrimental, as tending to cause headaches, colds, pneumonia, and other physiological disturbances.

In order that the benefits of my invention may be utilized by persons not qualified to prepare the described solutions or test papers, I may enclose any desired number of strips, as four strips, of a saturated test paper in a suitable vial, sealing the same in such manner as to assure their reaching the consumer in a satisfactory condition; and my preferred method of providing separate vials or other containers with suitably sensitized strips of test paper, or the like, involves a unique procedure, as follows:

I put the desired number of strips, as four strips, into a small vial, as a vial about ½ centimeter to 1 centimeter wide, and 3 to 6 centimeters long, thereafter dropping onto the said strips a sufficient quantity, as ½ cc., of the described protochlorid of palladium solution, this operation being effected in an atmosphere free from dangerous or reducing gases and promptly followed by a sealing of the mentioned container,—as by providing a cork with a coating of wax, or waxed paper, inserting the same, and then dipping the closed vial in the melted wax, and permitting the same to harden over the described closure. Alternatively, the test strips may be dried and later moistened for use; but the discoloration due to CO is then less uniform.

It will be understood that the reaction between the protochloride of palladium and carbon monoxide in the presence of water is presumably as follows:

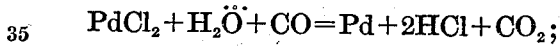

$$PdCl_2 + H_2O + CO = Pd + 2HCl + CO_2;$$

and, although other gases, as hydrogen sulfid or acetylene or certain unsaturated hydrocarbons, may have an analogous reducing effect, any blackening of the described test paper, or the darkening of a spot produced at the time of use, by applying the described solutions, for test purposes, upon a purified cellulose paper, or the like, is, in any event, a danger signal,—as indicating, for example, that some burner is operating unsatisfactorily, or that one of the mentioned gases is being generated or permitted to escape.

Although I have herein described a single complete embodiment of my invention, as the same relates to test solutions, test papers, and methods of preparing and using the same, it will be appreciated that various features of my invention might be independently employed, and also that numerous modifications, additional to those suggested, might be devised, by those skilled in the art to which this case relates, without the slightest departure from the spirit and scope of my invention, as the same is indicated above and in the following claims. For example, I may, if desired, effect an economy in the use of the mentioned protochloride by associating therewith small quantities of a less expensive salt, such as, for example, a copper salt, capable of cooperating therewith in producing, under the described conditions, a blackening effect of the general character described; but I make some use in all cases of the peculiar properties of the mentioned protochloride of palladium.

I claim as my invention:

1. As a means of detecting poisonous gases test papers containing palladium protochloride, said papers being kept moist by the presence of a hygroscopic salt.

2. As a means of detecting poisonous gases, test papers containing palladium protochloride, said papers kept moist by the presence of a hygroscopic salt associated with a gelatinous adhesive material.

3. A method of producing a test preparation which includes admixing palladium protochloride in water sufficient to produce a solution containing about .5% of said protochloride, said water containing a hygroscopic salt.

4. A method of producing a test preparation which includes admixing palladium protochloride in water sufficient to produce a solution containing about .5% of said protochloride, said water containing a hygroscopic salt and a gelatinous adhesive material.

In testimony whereof, I have hereunto set my hand at Los Angeles, California, this 9th day of March, 1926.

EDGAR W. HULTMAN.